US007930636B2

(12) United States Patent
Garbow et al.

(10) Patent No.: US 7,930,636 B2
(45) Date of Patent: Apr. 19, 2011

(54) SYSTEMS, METHODS AND COMPUTER PRODUCTS TO AUTOMATICALLY COMPLETE A GUI TASK

(75) Inventors: Zachary A. Garbow, Rochester, MN (US); Bryan M. Logan, Rochester, MN (US); Terrence T. Nixa, Rochester, MN (US); Kevin G. Paterson, San Antonio, TX (US)

(73) Assignee: International Business Machines Corporation, Armonk, NY (US)

( * ) Notice: Subject to any disclaimer, the term of this patent is extended or adjusted under 35 U.S.C. 154(b) by 837 days.

(21) Appl. No.: 11/846,230

(22) Filed: Aug. 28, 2007

(65) Prior Publication Data
US 2009/0064000 A1 Mar. 5, 2009

(51) Int. Cl.
*G06F 3/00* (2006.01)
(52) U.S. Cl. ........ 715/713; 715/705; 715/708; 715/712; 715/853; 715/854; 715/855; 715/838
(58) Field of Classification Search .................. 715/708, 715/712, 713
See application file for complete search history.

(56) References Cited

U.S. PATENT DOCUMENTS

| 5,727,129 | A  | * | 3/1998  | Barrett et al. ........... 706/10 |
| 6,189,024 | B1 | * | 2/2001  | Bauersfeld et al. ...... 709/203 |
| 6,631,345 | B1 |   | 10/2003 | Schumacher et al. |
| 7,024,658 | B1 | * | 4/2006  | Cohen et al. .............. 717/117 |
| 7,036,079 | B2 |   | 4/2006  | McGlinchey et al. |
| 7,565,607 | B2 | * | 7/2009  | McGlinchey et al. ...... 715/709 |
| 7,627,466 | B2 | * | 12/2009 | Ramsey et al. ........... 704/9 |

| 2006/0184880 | A1 | * | 8/2006  | Bala ..................... 715/705 |
| 2006/0184888 | A1 |   | 8/2006  | Bala |
| 2006/0288326 | A1 |   | 12/2006 | Raymond et al. |

OTHER PUBLICATIONS

GUI Evaluation Through Web, [online]; [retrieved on Aug. 27, 2007]; retrieved from the Internet http://www.dec.uchile.c1/~jsanchez/Pages/papers/guievaluation.pdf.
SpectorSoft—Spector Pro for Windows, [online]; [retrieved on Aug. 7, 2007]; retrieved from the Internet http://www.spectorsoft.com/products/SpectorPro_Windows/index.html.
Enhancing A GUI Event Recorder To Support The Automated Creation Of User Documentation*, [online]; [retrieved Aug. 27, 2007]; retrieved from the Internet http://www.cs.hope.edu/reu/papers/papers01/liu.htm.
URGenT Interface Migration, [online]; [retrieved Aug. 27, 2007]; retrieved from the Internet http://www.cs.ualberta.ca/~stroulia/CELLEST/new/tutorials/urgent/urgrnt.xml.html.

(Continued)

*Primary Examiner* — Alvin H Tan
(74) *Attorney, Agent, or Firm* — Cantor Colburn LLP

(57) ABSTRACT

Automatically completing a GUI task. Exemplary embodiments a method including providing a user configurable auto-completion application operating in the background of a computer operating system and executing on a computing device, the auto-completion application monitoring and archiving user activities, wherein certain actions by the user are parsed and indexed, analyzing the parsed and indexed actions of the user to determine at least one of relationships, user interactions, user statistics, various states of the user's actions over time, and images or video of the user's interaction to create an index of the user's typical interactions with the system and providing a fast-forward functionality based on the index such that a tree structure is presented to the user on a display device of the computing device, the tree structure indicating the user's current state in the system and one or more future states the user typically takes based on a past act.

14 Claims, 3 Drawing Sheets

OTHER PUBLICATIONS

Interface Agents in Model World Environments, [online]; [retrieved Sep. 24, 2010]; retrieved from the Internet http://www.aaai.org/ojs/index.php/aimagazine/article/view/1595/1494.

Jacobs et al.; "From Shell Logs to Shell Scripts"; Inductive Logic Programming, 11th International Conference, ILP 2001, Strasbourg, France, Sep. 9-11, 2001, Proceedings 2001.

Jacobs et al.; "The Learning Shell: Automated Macro Construction"; In Proceedings of the 8th international Conference on User Modeling 2001 (Jul. 13-17, 2007). M. Bauer, P. J. Gmytrasiewicz, and J. Vassileva, Eds. Lecture Notes In Computer Science. Springer-Verlag, London, 34-43.

Pixel Data Access for End-User Programming and Graphical Macros, [online]; [retrieved on Sep. 24, 2010]; retrieved from the Internet http://drum.lib.umd.edu/bitstream/1903/1009/2/CS-TR-4019.pdf.

Visual Generalization in Programming by Example, [online]; [retrieved on Sep. 24, 2010]; retrieved from the Internet http://people.csail.mit.edu/lsz/papers/slpz-cacm00.pdf.

* cited by examiner

SYSTEMS, METHODS AND COMPUTER PRODUCTS TO AUTOMATICALLY COMPLETE A GUI TASK

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to computing systems, including graphical user interfaces (GUI) and more particularly to a technique to automatically anticipate user actions to thereby automatically complete a GUI task in computing systems.

2. Description of Background

With computer applications having an increasing number of features, GUI environments are becoming more and more complex. Options are moving from a main menu into sub-menus or tabs. With a more complex layout, the user may be going through the same long steps in order to perform a task they have done many times before. Therefore, a system is need that can anticipate the user's possible final actions and present those anticipated actions to the user with an option to immediately perform the desired final action.

What is also needed is a method of monitoring the actions of a user such that they can be archived and searched at a later time to present choices to the user. What is also needed is a method of recognizing user patterns when working with various application programs such that the system can present relevant choices to the user.

A solution to some or all of these limitations or problems is therefore desired.

SUMMARY OF THE INVENTION

Exemplary embodiments include a method of providing an auto-completion feature in a graphical user interlace, the method including providing a user configurable auto-completion application operating in the background of a computer operating system and executing on a computing device, the auto-completion application monitoring and archiving user activities, wherein certain actions by the user are parsed and indexed, analyzing the parsed and indexed actions of the user to determine at least one of relationships, user interactions, user statistics, various states of the user's actions over time, and images or video of the user's interaction to create an index of the user's typical interactions with the system and providing a fast-forward functionality based on the index such that a tree structure is presented to the user on a display device of the computing device, the tree structure indicating the user's current state in the system and one or more future states the user typically takes based on past actions, wherein the auto-completion application includes instructions to query the indexed actions of the user to locate auto-completion options based on similar application states, compare an application and a user context to a prior context, and present auto-completion options that match a state of the application and the user context.

Further exemplary embodiments include a system of providing an auto-completion feature in a graphical user interface, the system including a computer readable medium, a computer operating system stored in the computer readable medium and executing oil a computing device, a user configurable auto-completion application executing in the background of the computer operating system, the auto-completion application monitoring and archiving user activities, wherein certain actions by the user are parsed and indexed, the user configurable auto-completion application executing in the background of the computer operating system analyzing the parsed and indexed actions of the user to determine at least one of relationships, user interactions, user statistics, various states of the user's actions over time, and images or video of the user's interaction to create an index of the user's typical interactions with applications executing on the computer operating system and the user configurable auto-completion application executing in the background of the computer operating system providing a fast-forward functionality based on the index by presenting a tree structure on a display of the computing device, the tree structure indicating the user's current state in the system and one or more future states the user typically takes based on past actions, wherein the auto-completion application includes instructions to query the indexed actions of the user to locate auto-completion options based on similar application states, compare an application and a user context to a prior context, and present auto-completion options that match a state of the application and the user context.

TECHNICAL EFFECTS

As a result of the summarized invention, technically we have achieved a solution in which a computer program product stored on machine readable media includes machine readable instructions for providing a system in a computer operating system for monitoring and archiving user actions when interacting with graphical user interfaces such that a user's final actions can be anticipated so that the method and system can present the user with the choice of completing the entire task when the first few steps are taken.

BRIEF DESCRIPTION OF THE DRAWINGS

The subject matter, which is regarded as embodiments of the invention, is particularly pointed out and distinctly claimed in the claims at the conclusion of the specification. The foregoing and other objects, features, and advantages of the invention are apparent from the following detailed description taken in conjunction with the accompanying drawings in which:

Figure 1:
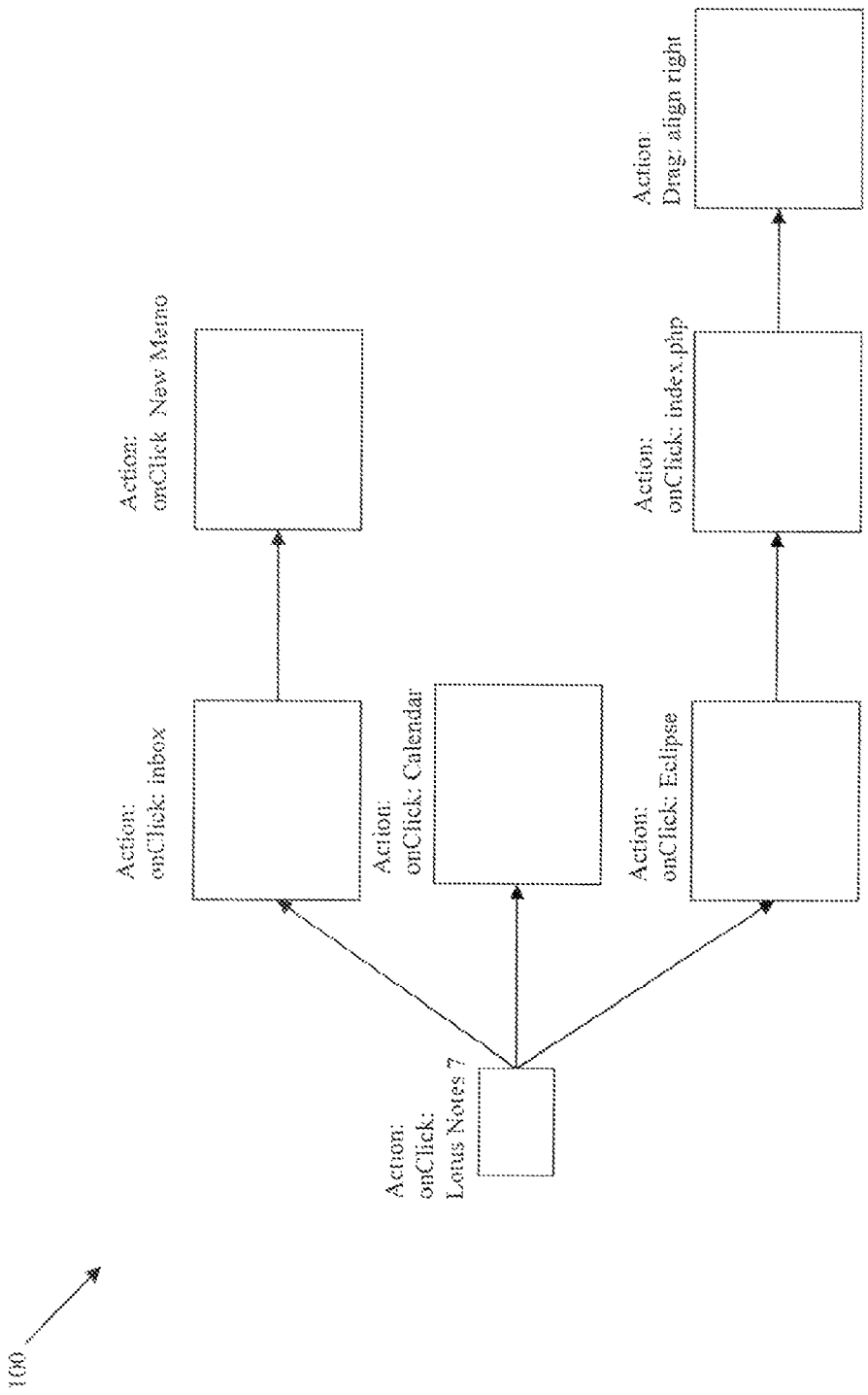
FIG. 1 illustrates a tree structure of the fast forward feature in accordance with exemplary embodiments.

The detailed description explains the preferred embodiments of the invention, together with advantages and features, by way of example with reference to the drawings.

DETAILED DESCRIPTION OF THE INVENTION

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

In exemplary embodiments, while a user is interacting with a GUI, the systems and methods described herein monitor the user's actions and archive what the user has done in order to be able to search against this data at a later point in time in order to present choices to the user. In exemplary embodiments, the monitoring aspect indexes the application in use, the actions being taken, the context surrounding those actions, and snapshots of those actions. For example, when using an image manipulation program, the systems and methods described herein may determine that the user always selects the medium brush size after changing their tool to the "smudge" tool. The systems and methods described herein can then recognize this pattern when the action is subsequently about to be performed, and present the user with the choice of completing the entire task when the first few steps are taken. Like auto-completion of a text-field, this feature becomes a user-friendly way of completely a task exactly the way it was completed before.

In exemplary embodiments, since the application is a GUI, the indexing and display of choices behave differently than a simple text-field. As such, it is appreciated that as a user works on his computer, snapshots are taken in the background on an interval that is configurable by the user, and increases/decreases based on the level of activity and CPU cycles available (fewer snapshots can be taken if the actions are fewer). The snapshots are analyzed with key features parsed and indexed. Identifiable relationships and structures are stored.

In exemplary embodiments, the following items demonstrate some of the logic that can be parsed and indexed: keywords; file structures and widgets (window, toolbar, scrollbar, buttons, tabs, etc); images; parent/child application relationships; user actions (double click, drag, keystroke, etc, which can also be accessed via OS hooks); results of actions (click on button A → window pops up), and the like.

The systems and methods described herein can also hook into the operating system (OS) to help determine relationships, (i.e. the inquiry as to whether a particular pop-up dialog a child process of the new window behind it). Upon entering a search query, the user can specify the type of results he/she would like to view. The user can see different states of the retrieved item in time, what actions led to the existence of the item (for example, the inquiry as to whether an action is due to a double click on a particular icon), images or video of the user's interaction with that item, etc.

In exemplary embodiments, the systems and methods described herein index the parsed features identified within the snapshots, rather than simply indexing plain text, which allows for more contextual information to be determined, such as the size of windows, relationships between windows and actions, etc.

In exemplary embodiments, the systems and methods described herein perform aggregating actions among a defined group, monitoring a user's application context, determining the most likely actions that the user may take based on group actions with similar context, and allowing the user to select from the group actions.

In exemplary embodiments, once an index is built up with snapshots and the related meta-data describing associated actions, relationships, and results, this information can be utilized to provide a fast-forward functionality similar to auto-completion A fast forward features enables a user to choose one of multiple likely end results (or an intermediate point in between), based on their current context and actions, and the system would simulate the intermediate actions required to achieve the chosen result. This feature is represented to the user via a tree structure, with their current state associated with the base of the tree, and likely end results represented by the tree nodes. Each node shows a thumbnail of the end result based on previous actions. If a user clicks on one of these thumbnail nodes, the actions required to get to that point are executed by the system similar to macros. FIG. 1 illustrates a tree structure 100 of the fast-forward feature in accordance with exemplary embodiments.

Figure 2:
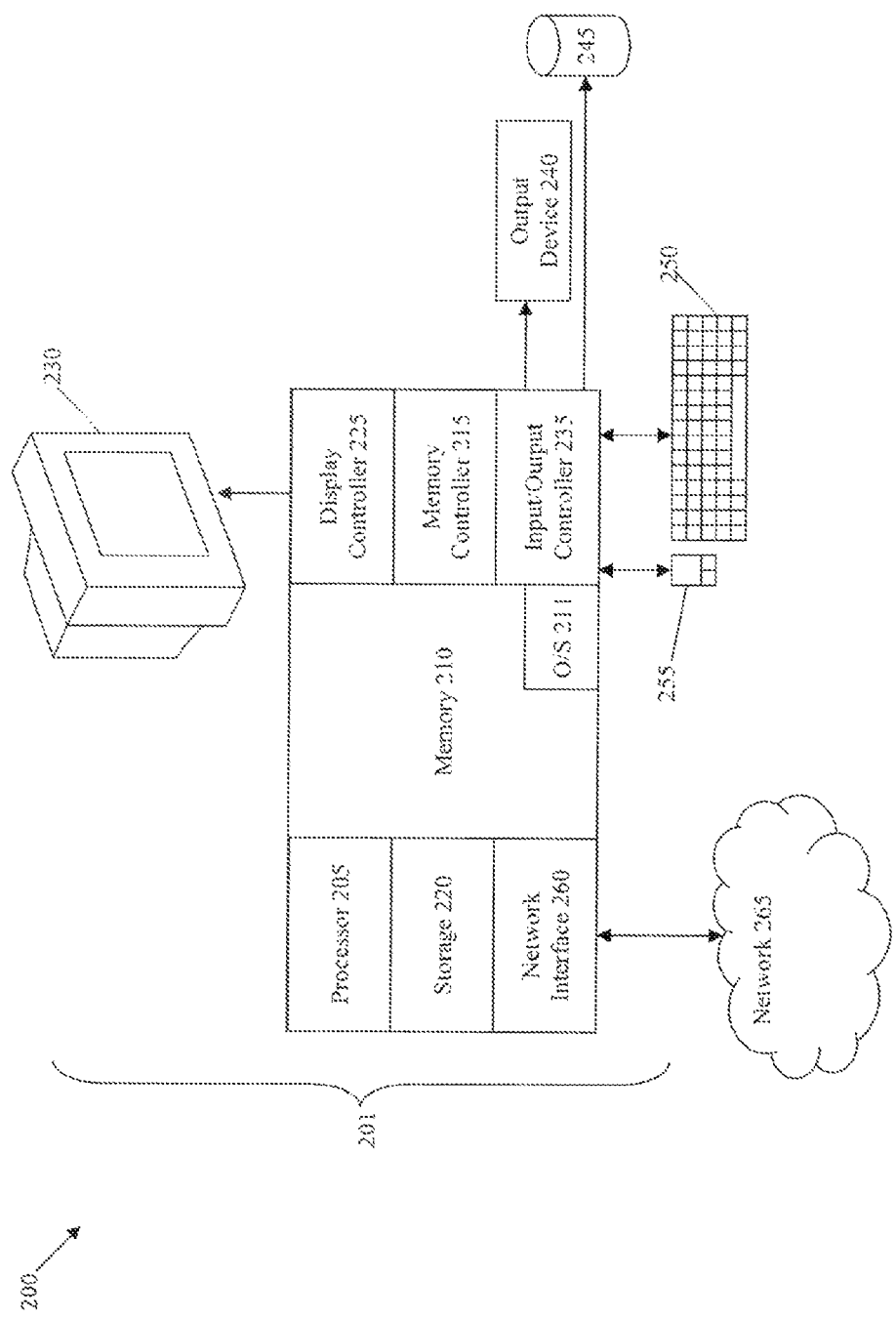
FIG. 2 illustrates an exemplary embodiment of a system for automatically completing a GUI task.

FIG. 2 illustrates an exemplary embodiment of a system 200 for automatically completing a GUI task. The methods described herein can be implemented in software (e.g., firmware), hardware, or a combination thereof. In exemplary embodiments, the methods described herein are implemented in software, as an executable program, and is executed by a special or general-purpose digital computer, such as a personal computer, workstation, minicomputer, or mainframe computer. The system 200 therefore includes general-purpose computer 201.

In exemplary embodiments, in terms of hardware architecture, as shown in FIG. 2, the computer 201 includes a processor 205, memory 210 coupled to a memory controller 215, and one or more input and/or output (I/O) devices 240, 245 (or peripherals) that are communicatively coupled via a local input/output controller 235. The input/output controller 235 can be, for example but not limited to, one or more buses or other wired or wireless connections, as is known in the art. The input/output controller 235 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 205 is a hardware device for executing software, particularly that stored in memory 210. The processor 205 can be any custom made or commercially available processor, a central processing unit (CPU), an auxiliary processor among several processors associated with the computer 201, a semiconductor based microprocessor (in the form of a microchip or chip set), a macroprocessor, or generally any device for executing software instructions.

The memory 210 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (EPROM), tape, compact disc read only memory (CD-ROM), disk, diskette, cartridge, cassette or the like, etc.). Moreover, the memory 210 may incorporate electronic, magnetic, optical, and/or other types of storage media. Note that the memory 210 can have a distributed architecture, where various components are situated remote from one another, but can be accessed by the processor 205.

The software in memory 210 may include one or more separate programs, each of which comprises an ordered listing of executable instructions for implementing logical functions. In the example of FIG. 2, the software in the memory 210 includes the methods for automatically completing a GUI task described herein in accordance with exemplary embodiments and a suitable operating system (OS) 211. The operating system 211 essentially controls the execution of other computer programs, such the systems and methods for automatically completing a GUI task described herein, and provides scheduling, input-output control, file and data management, memory management, and communication control and related services.

The methods for automatically completing a GUI task described herein may be in the form of a source program, executable program (object code), script, or any other entity comprising a set of instructions to be performed. A source program then needs to be translated via a compiler, assembler, interpreter, or the like, which may or may not be included within the memory 210, so as to operate properly in connection with the O/S 211. Furthermore, the methods for automatically completing a GUI task can be written as an object oriented programming language, which has classes of data and methods, or a procedure programming language, which has routines, subroutines, and/or functions.

In exemplary embodiments, a conventional keyboard 250 and mouse 255 can be coupled to the input/output controller 235. Other output devices such as the I/O devices 240, 245 may include input devices, for example but not limited to a printer, a scanner, microphone, and the like. Finally, the I/O devices 240, 245 may further include devices that communicate both inputs and outputs, for instance but not limited to, a NIC or modulator/demodulator (for accessing other files, devices, systems, or a network), a radio frequency (RF) or other transceiver, a telephonic interface, a bridge, a router, and the like. The system 200 can further include a display controller 225 coupled to a display 230. In exemplary embodiments, the system 200 can further include a network interface 260 for coupling to a network 265. The network 265 can be an IP-based network for communication between the computer 201 and any external server, client and the like via a broadband connection. The network 265 transmits and receives data between the computer 201 and external systems. In exemplary embodiments, network 265 can be a managed IP network administered by a service provider. The network 265 may be implemented in a wireless fashion, e.g., using wireless protocols and technologies, such as WiFi, WiMax, etc. The network 265 can also be a packet-switched network such as a local area network, wide area network, metropolitan area network, Internet network, or other similar type of network environment. The network 265 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 201 is a PC, workstations intelligent device or the like, the software in the memory 210 may further include a basic input output system (BIOS) (omitted for simplicity). The BIOS is a set of essential software routines that initialize and test hardware at startup, start the O/S 211, and support the transfer of data among the hardware devices. The BIOS is stored in ROM so that the BIOS can be executed when the computer 201 is activated.

When the computer 201 is in operation, the processor 205 is configured to execute software stored within the memory 210, to communicate data to and from the memory 210, and to generally control operations of the computer 201 pursuant to the software. The methods for automatically completing a GUI task described herein and the O/S 211, in whole or in part, but typically the latter, are read by the processor 205, perhaps buffered within the processor 205, and then executed.

When the systems and methods described herein are implemented in software, as is shown in FIG. 2, the methods can be stored on any computer readable medium, such as storage 220, for use by or in connection with any computer related system or method. In the context of this document, a computer readable medium is an electronic, magnetic, optical, or other physical device or means that can contain or store a computer program for use by or in connection with a computer related system or method. The methods for automatically completing a GUI task described herein can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In exemplary embodiments, a "computer-readable medium" can be any means that can store, communicate, propagate, or transport the program for use by or in communication with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In exemplary embodiments, where the methods for automatically completing a GUI task are implemented in hardware, the methods for automatically completing a GUI task described herein can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 3:
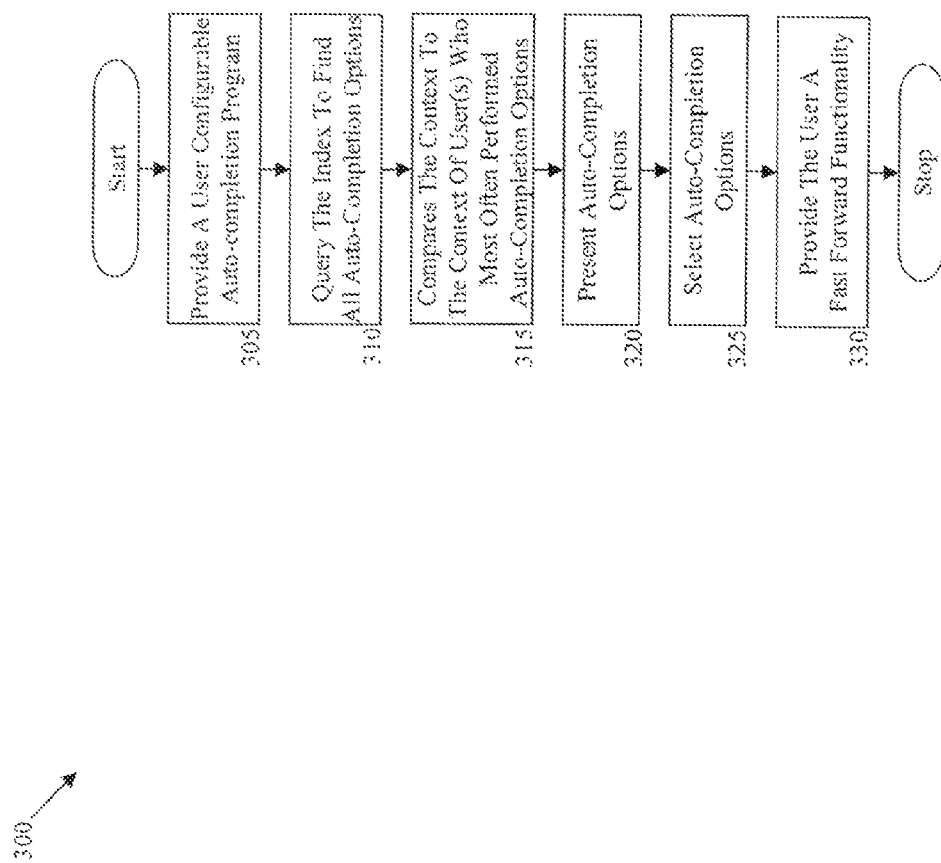
FIG. 3 illustrates a flowchart of a method for automatically completing a GUI task.

FIG. 3 illustrates a flowchart of a method 300 for automatically completing a GUI task. At step 305, the method 300 provides a user configurable auto-completion application operating in the background of a computer operating system and executes on a computing device, the auto-completion application monitoring and archiving user activities, wherein certain actions by the user are parsed and indexed. It is appreciated that the systems and methods described herein the method analyze the parsed and indexed actions of the user to determine at least one of relationships, user interactions, user statistics, various states of the user's actions over time, and images or video of the user's interaction to create an index of the user's typical interactions with the system. As such the auto-completion options are now described. At step 310, from an application state the system 200 queries the index to find all auto-completion options based on similar application states. At step 315, from the auto-completion options collected, system 200 compares the application and user context to the context of users who most often performed each auto-completion option. At step 320, the system 200 then presents X number of auto completion options that most closely match the user's application state and user context, where X is configurable by the user. At step 325, the user can then choose from one of these presented auto-completion options. At step 330, the method 300 further provides a fast-forward functionality based on the index such that a tree structure is presented to the user on a display device of the computing device, the tree structure indicating the user's current state in the system and one or more future states the user typically takes based on past actions.

In exemplary embodiments, the systems and method described herein utilize various techniques to effectively minimize the CPU utilization and DASD requirements, such that the system does not interfere with a user's work. The indexing rate of the snapshots can be determined based on the current CPU utilization, such that during times of heavy CPU use, the system can optionally reduce its indexing interval. During heavy CPU utilization by the user, the system can take snapshots, but delay the parsing and analysis of the snapshot until CPU cycles are available (can also be scheduled for times when the user is not using the computer). The indexing can be heavily compressed since successive snapshots are almost identical in many cases. The system can optionally analyze, index, and store only parts of the image that have changed from one snapshot to the next. The system can use high resolutions snapshots for parsing and analysis, and once the logic has been extracted and indexed, the associated image can be highly compressed before being stored.

It is appreciated that the above discussion provided examples of a single user implementing the auto-completion systems and methods described herein. In exemplary embodiments, the systems and methods described herein can further be implemented by groups/communities of users. As such the systems and methods described herein can be set up to accommodate groups/communities in order to retrace the aggregate steps of people who are most likely to be using the application in the same way a single user has implemented auto-completion. For example, in a given application, several individual users may use the application differently based on their project and their requirements for working on their project. However it is oftentimes difficult or impossible to discover the best ways to perform common actions until an individual user actually witness someone else doing it. In exemplary embodiments, the systems and method described herein monitor the actions of all individuals in the group/community and shows each user possible ways to do a common action (e.g., open a debug session) based on how other group members execute the same function.

In exemplary embodiments, as users implement an application, the actions, metadata, context and snapshots are saved and associated with an individual profile. A user can then set up groups/communities of users within the system. The systems and methods described herein can then aggregate the most likely actions taken by a group of users given the user's context. Additionally, the systems and methods described herein can determine which groups to aggregate based on a particular context. For example, in an application the systems and methods described herein recognize, based on a fingerprint of actions and a context (i.e. the plug-ins and files in use) that a particular user is likely mirroring the actions of my a larger group. The systems and methods described herein then aggregate the common actions of the larger group given the user's current context. When the user chooses to create a new plug-in, the systems and methods described herein show the user snapshots of the next actions the user is most likely to take, based on what other application developers have most often done in similar situations. The user can then perform the "fast forward" macro type action based on the options presented to the user, as described herein.

In exemplary embodiments, the systems and methods described herein further provide for the extension of security and privacy, such that the amount of information that is shared with the group is dependent on who is in the group, the size of the group, and the relation of the group to a particular user. For example, in a given group, a user may elect to have the user's exact actions shared and aggregated, including the snapshots of the actions. However, in another more general developers group, the user does not want to share screenshots, as wishes to only let the user's actions be aggregated with the actions of others. Therefore, the actions of multiple users are aggregated into groups, and the systems and methods described herein determine which group's aggregations to use. Once chosen, the "fast forward" snapshots and options are presented to the user based on the actions other users in the currently selected group most typically perform under similar circumstances.

In exemplary embodiments, same group-based aggregation of likely actions can be effectively applied to actions in Virtual Worlds, using a similar systems and methods described herein. The actions/context/metadata (and location) of users are associated with the groups they belong to, and are subsequently used to provide other members in that group choices of common group actions given that user's current context.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method of providing an auto-completion feature in a graphical user interface (GUI), the method consisting of:
providing a user configurable auto-completion application operating in a background of a computer operating system and executing on a computing device, the auto-completion application monitoring and archiving user activities, wherein certain actions by a user are parsed and indexed, and wherein snapshots of images on the GUI are stored, an interval of snapshots being taken and an indexing rate depending on CPU utilization;
analyzing the parsed and indexed actions of the user to determine at least one of relationships, user interactions, user statistics, various states of the user's actions over time, and images or video of the user's interaction to create an index of typical interactions of the user with the system; and
providing a fast-forward functionality based on the index such that a tree structure is presented to the user on a display device of the computing device, the tree structure indicating a current state of the user in the system and one or more future states the user typically takes based on past actions, wherein the auto-completion application includes instructions to:

query the indexed actions of the user to locate auto-completion options based on similar application states;

compare an application and a user context to a prior context; and present auto-completion options that match a state of the application and the user context, wherein the interval of snapshots being taken and the indexing rate are one of increased or decreased depending on CPU utilization, such that during heavy CPU utilization the interval of snapshots being taken can be maintained, and parsing and analysis of the snapshots are delayed until CPU cycles are available, and wherein indexing can be compressed.

2. The method of claim 1, wherein the parsed and indexed actions comprises at least one of keywords, file structures, images, parent/child application relationships, user actions and application results.

3. The method of claim 2, wherein user actions comprises at least one of keystrokes, mouse clicks, and preference settings.

4. The method of claim 3, wherein the system simulates intermediate actions required to achieve a chosen result.

5. The method of claim 4, wherein the presented tree structure, presents the current state as a base of the tree and likely end results are represented by tree nodes.

6. The method of claim 5, wherein each tree node shows a thumbnail of an end result based on previous actions.

7. The method of claim 6, wherein the user may select an end result by selecting an associated thumbnail, the operating system generates a series of macros to automatically provide the end result to the user.

8. A system of providing an auto-completion feature in a graphical user interface (GUI), the system comprising:

a non-transitory computer readable medium;

a computer operating system stored in the non-transitory computer readable medium and executing on a computing device;

a user configurable auto-completion application executing in a background of the computer operating system, the auto-completion application monitoring and archiving user activities, wherein certain actions by a user are parsed and indexed, and wherein snapshots of images on the GUI are stored, an interval of snapshots being taken and an indexing rate depending on CPU utilization;

the user configurable auto-completion application executing in the background of the computer operating system analyzing the parsed and indexed actions of the user to determine at least one of relationships, user interactions, user statistics, various states of the user's actions over time, and images or video of the user's interaction to create an index of typical interactions of the user with applications executing on the computer operating system; and the user configurable auto-completion application executing in the background of the computer operating system providing a fast-forward functionality based on the index by presenting a tree structure on a display of the computing device, the tree structure indicating a current state of the user in the system and one or more future states the user typically takes based on past actions, wherein the auto-completion application includes instructions to:

query the indexed actions of the user to locate auto-completion options based on similar application states;

compare an application and a user context to a prior context; and present auto-completion options that match a state of the application and the user context, wherein the interval of snapshots being taken and the indexing rate are one of increased or decreased depending on CPU utilization, such that during heavy CPU utilization the interval of snapshots being taken can be maintained, and parsing and analysis of the snapshots are delayed until CPU cycles are available, and wherein indexing can be compressed.

9. The system of claim 8, wherein the parsed and indexed actions comprises at least one of keywords, file structures, widgets, parent/child application relationships, user actions and application results.

10. The system of claim 9, wherein user actions comprises at least one of keystrokes, mouse clicks, and preference settings.

11. The system of claim 10, wherein the system simulates intermediate actions required to achieve a chosen result.

12. The system of claim 11, wherein the presented tree structure, presents the current state as a base of the tree and likely end results are represented by tree nodes.

13. The system of claim 12, wherein each tree node shows a thumbnail of an end result based on previous actions.

14. The system of claim 13, wherein the user may select an end result by selecting an associated thumbnail, the operating system generates a series of macros to automatically provide the end result to the user.

* * * * *